United States Patent [19]

Ashley et al.

[11] Patent Number: 4,656,749

[45] Date of Patent: Apr. 14, 1987

[54] HAND DRILL LEVEL

[76] Inventors: Donnie L. Ashley, 327 E. Marshall St., Marion, Ind. 46952; George Spector, 233 Broadway RM 3615, New York, N.Y. 10007

[21] Appl. No.: 820,974

[22] Filed: Jan. 22, 1986

[51] Int. Cl.⁴ ............................................ B23B 45/00

[52] U.S. Cl. ...................................... 33/334; 33/347; 33/371

[58] Field of Search ................. 33/334, 347, 370, 371, 33/373, 372

[56] References Cited

U.S. PATENT DOCUMENTS

| | | | |
|---|---|---|---|
| 2,525,387 | 10/1950 | Volk | 33/334 X |
| 2,806,296 | 9/1957 | Weichert | 33/334 |
| 3,664,754 | 5/1972 | Kelbel | 33/334 X |
| 4,546,549 | 10/1985 | Duperon | 33/334 |

*Primary Examiner*—William D. Martin, Jr.

[57] ABSTRACT

A hand drill level is provided and consists of a mounting frame removably mountable to top surface of a shank portion of a hand drill and a vial that has a bubble chamber operably affixed within the mounting frame and parallel to a longitudinal axis of a drill bit to aid in drilling holes straight through a work piece.

3 Claims, 6 Drawing Figures

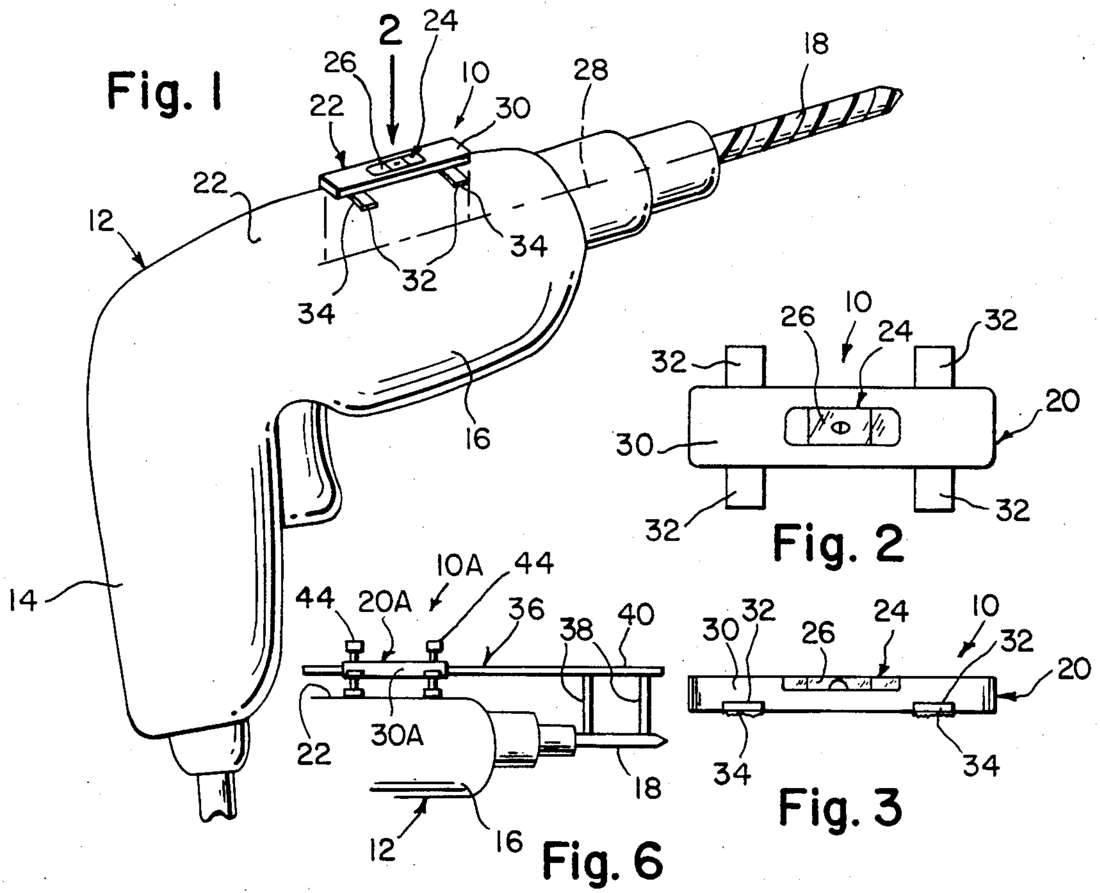
Fig. 1
Fig. 2
Fig. 6
Fig. 3
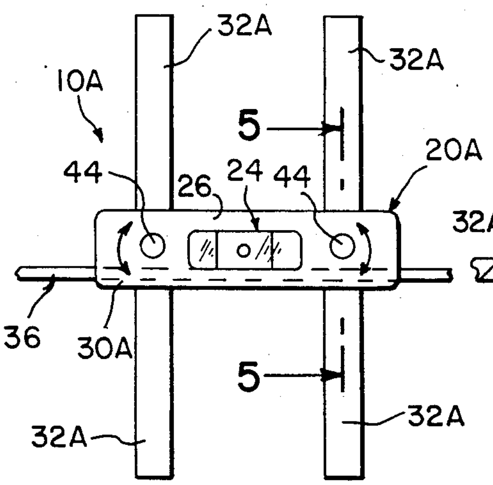
Fig. 4
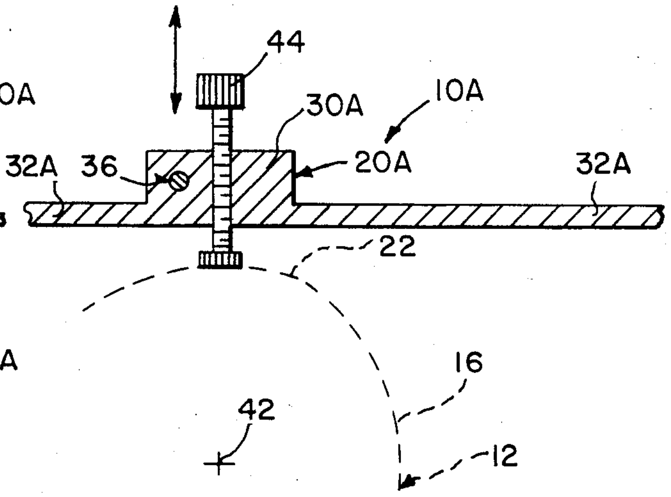
Fig. 5

HAND DRILL LEVEL

BACKGROUND OF THE INVENTION

The instant invention relates generally to leveling devices and more specifically it relates to a hand drill level.

Numerous leveling devices have been provided in prior art that are adapted to level the working axis of various hand tools. For example, U.S. Pat. Nos. 3,664,032; 3,664,754 and 4,295,279 all are illustrative of such prior art. While these units may be suitable for the particular purpose to which they address, they would not be as suitable for the purposes of the present invention as heretofore described.

SUMMARY OF THE INVENTION

A principle object of the present invention is to provide a hand drill level that overcomes the shortcomings of the prior art devices.

Another object is to provide a hand drill level that can be quickly attached on top of a housing of a hand drill parallel to its drill bit to aid in drilling holes straight through a work piece.

An additional object is to provide a hand drill level having structure thereon so as to mount the bubble level completely parallel to the drill bit.

A further object is to provide a hand drill level that is simple and easy to use.

A still further object is to provide a hand drill level that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a hand drill with the invention mounted thereto.

FIG. 2 is an enlarged top plan view of just the invention as indicated by numeral 2 in FIG. 1.

FIG. 3 is a side view thereof.

FIG. 4 is a top plan view similar to FIG. 2 of a modification showing level adjustment screws and long tabs to measure center of the drill bit.

FIG. 5 is a cross sectional view taken along line 5—5 in FIG. 4.

FIG. 6 is a partial side view of the drill showing how to mount the bubble level parallel to the drill bit.

DETAILED DESCRIPTION OF THE PREFERRED EMBODIMENTS

Turning now descriptively to the drawings, in which similar reference characters denote similar elements throughout the several views, FIGS. 1 through 3 illustrates a hand drill level 10 for a conventional hand drill 12 that has a handle portion 14 and a shank portion 16 adapted to secure a conventional drill bit 18.

The hand drill level 10 consists of a mounting frame 20 removably mountable to top surface 22 of the shank portion 16 of the hand drill 12. A vial 24 that has a bubble chamber 26 is operably affixed within the mounting frame 20 and parallel to a longitudinal axis 28 of the drill bit 18 to aid in drilling holes straight through a work piece (not shown).

The mounting frame 20 includes a receptacle 30 of a pre-determined configuration, four pliable tabs 32 extending outwardly from sides of the receptacle 30 and adhesive material 34 placed on underside of the tabs 32.

A modified hand drill level 10A is shown in FIGS. 4 through 6. The mounting frame 20A includes a leveling rod 36 horizontally slideable through the receptacle 30A. The rod 36 has two transverse legs 38 of equal length spaced apart at front end 40 to extend downwardly to make contact with the drill bit 18 for stabalizing the receptacle 30A (see FIG. 6).

The tabs 38A are elongated to aid in measuring center 42 of the drill bit 18, (see FIG. 5). A pair of adjustment screws 44 are provided. Each of the screws 44 vertically thread through opposite ends of the receptacle 30A to adjust the receptacle to the longitudinal axis 28 of the drill bit 18.

The mounting frame 20 and 20A can be fabricated out of aluminum plastic or any other durable material. The adhesive material 34 can be super glue, tape or VELCRO.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hand drill level for a conventional hand drill having a handle portion and a shank portion adapted to secure a conventional drill bit, said hand drill level comprising:
   - (a) a mounting frame removeably mountable to top surface of said shank portion of said hand drill;
   - (b) a vial having a bubble chamber operably affixed within said mounting frame and parallel to longitudinal axis of said drill bit to aid in drilling holes straight through a work piece, wherein said mounting frame includes:
   - (c) a receptacle of a per-determined configuration;
   - (d) a plurality of pliable tabs extending outwardly from sides of said receptacle;
   - (e) adhesive material placed on underside of said tabs so that said tabs can be bent to conform to contour of said top surface of said shank portion of said hand drill and be removeably mountable thereto, wherein said mounting frame further includes:
   - (f) a leveling rod horizontally slideable through said receptacle, said rod having two transverse legs of equal length spaced apart at front end to extend downwardly to make contact with said drill but for stabilizing said receptacle;
   - (g) said tabs being elongated to aid in measuring center of said drill bit; and
   - (h) a pair of adjustment screws, each of said screws vertically thread through opposite ends of said receptacle to adjust said receptacle to said longitudinal axis of said drill bit.

2. A hand drill level as recited in claim 1, wherein said mounting frame is fabricated out of aluminum.

3. A hand drill level as recited in claim 1, wherein said mounting frame is fabricated out of plastic.

* * * * *